Feb. 7, 1950   F. DUNAWAY   2,496,524
FEEDING ARM FOR HAY BALERS
Filed March 5, 1948

Frank Dunaway
INVENTOR.

Patented Feb. 7, 1950

2,496,524

UNITED STATES PATENT OFFICE 2,496,524

FEEDING ARM FOR HAY BALERS

Frank Dunaway, Cowden, Ill.

Application March 5, 1948, Serial No. 13,145

4 Claims. (Cl. 198—166)

This invention relates to a feeding apparatus or attachment for a baling machine for hay, alfalfa or the like agricultural products and has for its principal object to guide or urge material to be baled into actuated engagement with a feeder so as to prevent clogging of the feeding device and also to obviate the tendency of the material to pile up adjacent the feeding device.

Another object of this invention is to provide a guide or positioning attachment for a feeding device of a baling machine which is responsive to the quantity of material in the feeding chamber and which is operated in synchronization with the feeding device so that it functions in a complementary character relative to the feeding device.

A meritorious feature of this invention resides in the provision of a feeding attachment for a baling machine, wherein the machine includes a frame, a material conveyor passageway, a feed roller journaled in said passageway and an external gear carried by the roller, the feeding or material guide attachment including a feed arm pivoted to said frame and actuated by the gear for vertical reciprocation relative to said roller.

Another important feature of this invention resides in the provision of an extending curved terminal on said feed arm, which is lateral to the roller and which urges or moves material into engagement with the roller.

Figure 1:
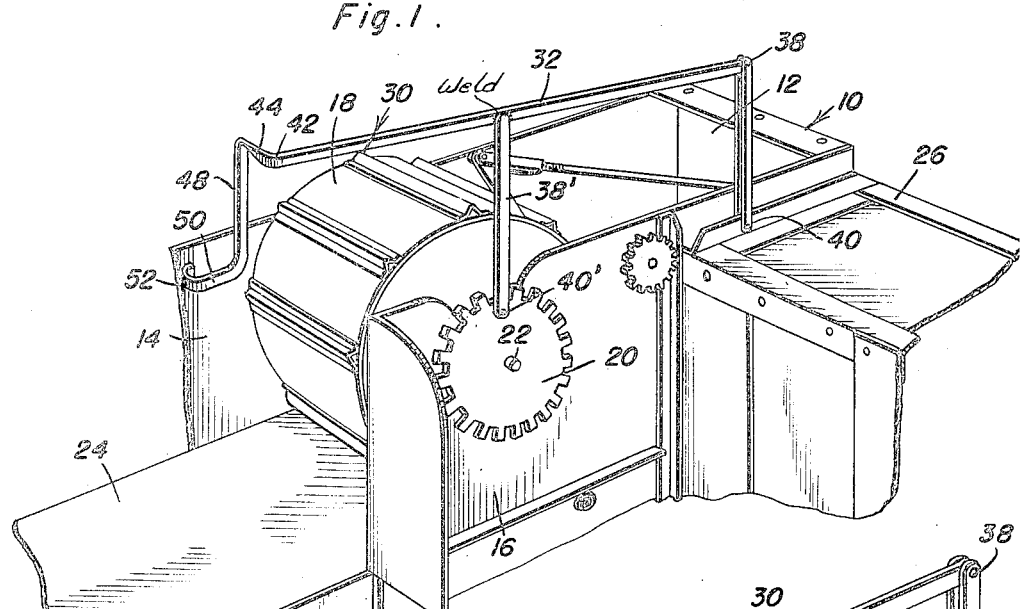
Figure 2:
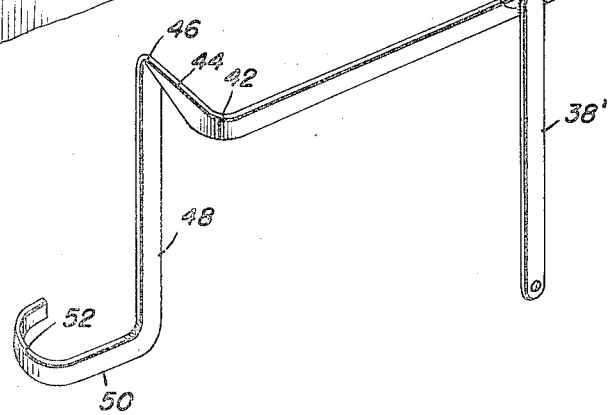

These and ancillary objects and other meritorious features are attained by this invention, a preferred embodiment of which is set forth in the following description and illustrated in the accompanying drawing, wherein, Figure 1 is a perspective view of a feeding apparatus for a baling machine, showing a guide device constructed in accordance with the principles of this invention, attached thereto, and, Figure 2 is a view in perspective of the guide device, per se, as shown generally in operative attachment in Figure 1.

Referring now more particularly to the drawings, wherein similar characters of reference designate corresponding parts throughout and with particular reference to Figure 1 thereof, there is shown a conventional feed device for a material baler, such as a hay baler or the like, not shown, generally denoted by numeral 10, comprising a rectangular closed top passageway 12 having opposed longitudinal sides 14 and 16 with a feed roller 18 journaled transversely therebetween and operatively spaced in proximity to the open end thereof. A gear wheel 20 is keyed on the roller shaft 22 exteriorly of the side 14 of the passageway 12.

In employing this conventional structure, the material is manually placed on the conveyor belt 24 in the passageway and the feed roller 18 grasps the material and presses it to a certain degree, advancing it to the press box 26, which is laterally secured adjacent the closed end of the passageway.

However, the material has a tendency to clog adjacent the roller feed and also, the roller 18 is not always able to grip or grasp the material, especially if the material is dry.

To obviate these defects, a guide or material positioning device 30 is provided and is adapted to be easily attached to and operated by the feed apparatus 10.

The guide device 30 comprises an elongated bar or strap 32 having its extremity suitably apertured and pivoted to a pair of complementary pitman bars 34 and 36 by means of a pivot pin 38. The pitman bars have their depending extremities pivoted as at 40 to the frame of the feed device and serve to vertically space the strap 32 from the side 16 of the passageway, suitable bearings or bushings being provided at the pivot point 40.

A depending actuating bar 38', is rigidly secured at its upper end to the middle of the bar 32 and has its opposite end riveted for pivotal movement or otherwise secured, as at 40', to the side of the gear wheel 20 adjacent the toothed periphery thereof.

The strap 32 extends longitudinally and parallel to and in spaced proximity to the side 16 of the passageway and is angularly bent as at 42 defining a lateral section 44 positioned in front of the roller 18.

The transverse or lateral section 44 is bent as at 46 and forms a depending vertical section 48, which extends forwardly in a projected section 50. A semi-circular or arcuate extremity 52 is disposed on the extended extremity of the section 50, with the section 52 being rearwardly terminating, adjacent the side 14 of the passageway 12.

In operation, the strap 32 is moved downwardly by the revolution of the gear wheel 20 in synchronization with the roller 18 and the arcuate or curved terminal 52 serves to move the material towards the lead edge of the roller 18.

Thus, it can be seen that there is provided a guide apparatus for use in association with a feeding mechanism that in operation will render more smooth and efficient the operation of the feeding mechanism by obviating the tendency of material to clog the mechanism and by positively enabling the progressive feed of the material to the feeding mechanism.

However, since many other modifications and purposes of this invention will become apparent to those skilled in the art upon a perusal of the foregoing description in view of the accompanying drawings, it is to be understood that certain changes not amounting to invention may be effected thereon without constituting a departure from the spirit of the invention and within the scope of the appended claims.

Having described the invention, what is claimed as new is:

1. A guide attachment for use with a feeding device including a trough, a feed roller journalled therein, an extending member carried by the roller comprising: an elongated bar pivotally carried at one end by the trough, a depending actuating arm connected between said bar and the extending roller member, a lateral portion on said bar disposed in front of the roller, a depending angular portion thereon and an inturned horizontal arcuate arm on said depending portion so that the rotation of the roller reciprocates the arcuate arm to advance material to the roller.

2. A feeding device for hay balers which includes a trough and a roller transversely journalled therein: comprising an elongated bar pivotally supported above the trough and disposed parallel therewith, actuating means operatively connected to the roller and to the bar, a lateral end on said bar disposed in advance of the roller and a depending inturned arm on said end.

3. In combination with a feeding device including a trough and a roller transversely journalled therein, a feeding attachment comprising an elongated member pivotally mounted on the trough, an actuating bar connected to the member and operatively connected to and reciprocated by the roller, a lateral extension on said member disposed in advance of the roller and parallel therewith, a downwardly extending end on said extension and an inturned arm on said end.

4. In a baler which includes a trough and a roller transversely journalled therein, a feeding attachment comprising an elongated member, vertical supporting bars pivotally connected between the member and the trough, an actuating bar associated for reciprocatory movement with the roller and secured to the member, a lateral extension on said member disposed in advance of the roller and a depending inturned arm carried by the extension.

FRANK DUNAWAY.

REFERENCES CITED

The following references are of record in the file of this patent:

UNITED STATES PATENTS

| Number | Name | Date |
|---|---|---|
| 487,363 | Boles | Dec. 6, 1892 |
| 701,240 | Wood | May 27, 1902 |
| 821,646 | Juno | May 29, 1906 |
| 2,349,847 | Crumb | May 30, 1944 |
| 2,430,082 | Russell | Nov. 4, 1947 |